United States Patent
Dange et al.

(10) Patent No.: US 8,402,027 B1
(45) Date of Patent: Mar. 19, 2013

(54) SYSTEM AND METHOD FOR HYBRID HIERARCHICAL SEGMENTATION

(75) Inventors: Anjali Dange, Orlando, FL (US); Xia Ying, Orlando, FL (US); Rudranil Manna, Orlando, FL (US); Cameron Davies, Winter Garden, FL (US); Phi Hoang, Kissimmee, FL (US); Deborah Montague, Orlando, FL (US); Mark W. Shafer, Orlando, FL (US)

(73) Assignee: Disney Enterprises, Inc., Burbank, CA (US)

( * ) Notice: Subject to any disclaimer, the term of this patent is extended or adjusted under 35 U.S.C. 154(b) by 406 days.

(21) Appl. No.: 12/704,403

(22) Filed: Feb. 11, 2010

(51) Int. Cl.
*G06F 17/30* (2006.01)

(52) U.S. Cl. .......................... 707/737; 707/752; 707/756

(58) Field of Classification Search .................. 707/736, 707/737, 738, 740, 752, 756, 956
See application file for complete search history.

(56) References Cited

U.S. PATENT DOCUMENTS

| | | | |
|---|---|---|---|
| 5,832,182 A * | 11/1998 | Zhang et al. ................... 706/50 |
| 6,092,072 A * | 7/2000 | Guha et al. ..................... 707/700 |
| 6,263,337 B1 * | 7/2001 | Fayyad et al. .................... 1/1 |
| 6,374,251 B1 * | 4/2002 | Fayyad et al. .................... 1/1 |
| 6,990,238 B1 * | 1/2006 | Saffer et al. .................... 382/224 |
| 7,174,343 B2 * | 2/2007 | Campos et al. ................ 707/737 |
| 7,664,718 B2 * | 2/2010 | Acharya et al. ................. 706/45 |
| 7,818,322 B2 * | 10/2010 | Tantrum ........................ 707/737 |
| 7,822,745 B2 * | 10/2010 | Fayyad et al. ................. 707/732 |
| 7,840,568 B2 * | 11/2010 | Purang et al. ................. 707/748 |
| 7,979,426 B2 * | 7/2011 | Jeong et al. ................... 707/723 |
| 2003/0176931 A1 * | 9/2003 | Pednault et al. ................ 700/31 |
| 2003/0208523 A1 * | 11/2003 | Gopalan et al. ............... 709/201 |
| 2004/0059830 A1 * | 3/2004 | Brown .......................... 709/238 |
| 2007/0136275 A1 * | 6/2007 | Wan ................................ 707/5 |
| 2007/0271278 A1 * | 11/2007 | Acharya ....................... 707/100 |
| 2007/0271287 A1 * | 11/2007 | Acharya et al. ............... 707/101 |
| 2007/0271292 A1 * | 11/2007 | Acharya et al. ............... 707/102 |
| 2009/0006309 A1 * | 1/2009 | Hunt et al. ....................... 707/1 |
| 2009/0196511 A1 * | 8/2009 | Gendron et al. .............. 382/225 |
| 2011/0060738 A1 * | 3/2011 | Gates et al. ................... 707/737 |

OTHER PUBLICATIONS

SAS Institute, Applied Clustering Techniques Course Notes, pp. 2-2 to 2-5, 2005.
SAS Online Doc 9.1.3, "The CLUSTER Procedure—Clustering Methods," 2004 (available at: http://support.sas.com/onlinedoc/913/getDoc/en/statug.hlp/cluster_sect12.htm).

* cited by examiner

*Primary Examiner* — John E Breene
*Assistant Examiner* — Evan Aspinwall
(74) *Attorney, Agent, or Firm* — Patterson & Sheridan, LLP

(57) ABSTRACT

A computer-implemented method for clustering a plurality of observations included in a dataset. The method includes selecting a subset of variables from a set of variables, where each variable in the subset is associated with each observation in the dataset; for each of a first number of times, randomly selecting an initial value for each variable in the subset to generate a seed value set that includes an initial value for each variable in the subset; generating a number of pre-clusters equal to the first number based on a similarity between each observation in the dataset and each of the first number of seed value sets; and applying a hierarchical clustering algorithm to the first number of pre-clusters to derive a second number of clusters.

22 Claims, 4 Drawing Sheets

SYSTEM AND METHOD FOR HYBRID HIERARCHICAL SEGMENTATION

BACKGROUND

1. Field of the Invention

The present invention relates to the field of data clustering and, in particular, to a system and method for hybrid hierarchical segmentation.

2. Description of the Related Art

Clustering is the process of dividing a set of observations into smaller subsets. Some conventional approaches to clustering are very computationally expensive and simply cannot be applied to large datasets, such as datasets with over 150 million observations, each associated with 500 or more variables. Other conventional approaches rely on sampling the dataset a pre-determined number of times and generating clusters associated with the samples. These sampling-based approaches suffer from lack of replicability, since the resultant clusters are highly susceptible to bias based on the initial sampling and the number of samples. Still other clustering approaches rely on segmenting the data based on business rules. These rule-based approaches also suffer from bias based on the original selection of the business rules.

As the foregoing illustrates, there is a need in the art for a mathematical clustering technique that is replicable and can be applied to large datasets.

SUMMARY

Embodiments of the invention provide a technique for performing hybrid hierarchical segmentation. Embodiments of the invention utilize k-means clustering to create a relatively large number of clusters. The result of performing k-means clustering is then passed through a hierarchical model to determine the optimal cluster groupings, thereby removing the biasing effect of the pre-defined number of samples. This hybrid approach allows embodiments of the invention to consider all of the original data, while still creating a holistic segmentation that maximizes the similarities within a cluster as well as maximizes the Euclidean distances between clusters.

One embodiment of the invention provides a computer-implemented method for clustering a plurality of observations included in a dataset. The method includes selecting a subset of variables from a set of variables, where each variable in the subset is associated with each observation in the dataset; for each of a first number of times, randomly selecting an initial value for each variable in the subset to generate a seed value set that includes an initial value for each variable in the subset; generating a number of pre-clusters equal to the first number based on a similarity between each observation in the dataset and each of the first number of seed value sets; and applying a hierarchical clustering algorithm to the first number of pre-clusters to derive a second number of clusters.

One advantage of embodiments of the invention is that they provide a clustering solution for a large number of observations that is computationally achievable with current hardware. Another advantage is that embodiments of the invention do not rely on the quality of the sample set and avoid the biasing problems associated with prior art techniques.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Figure 1:
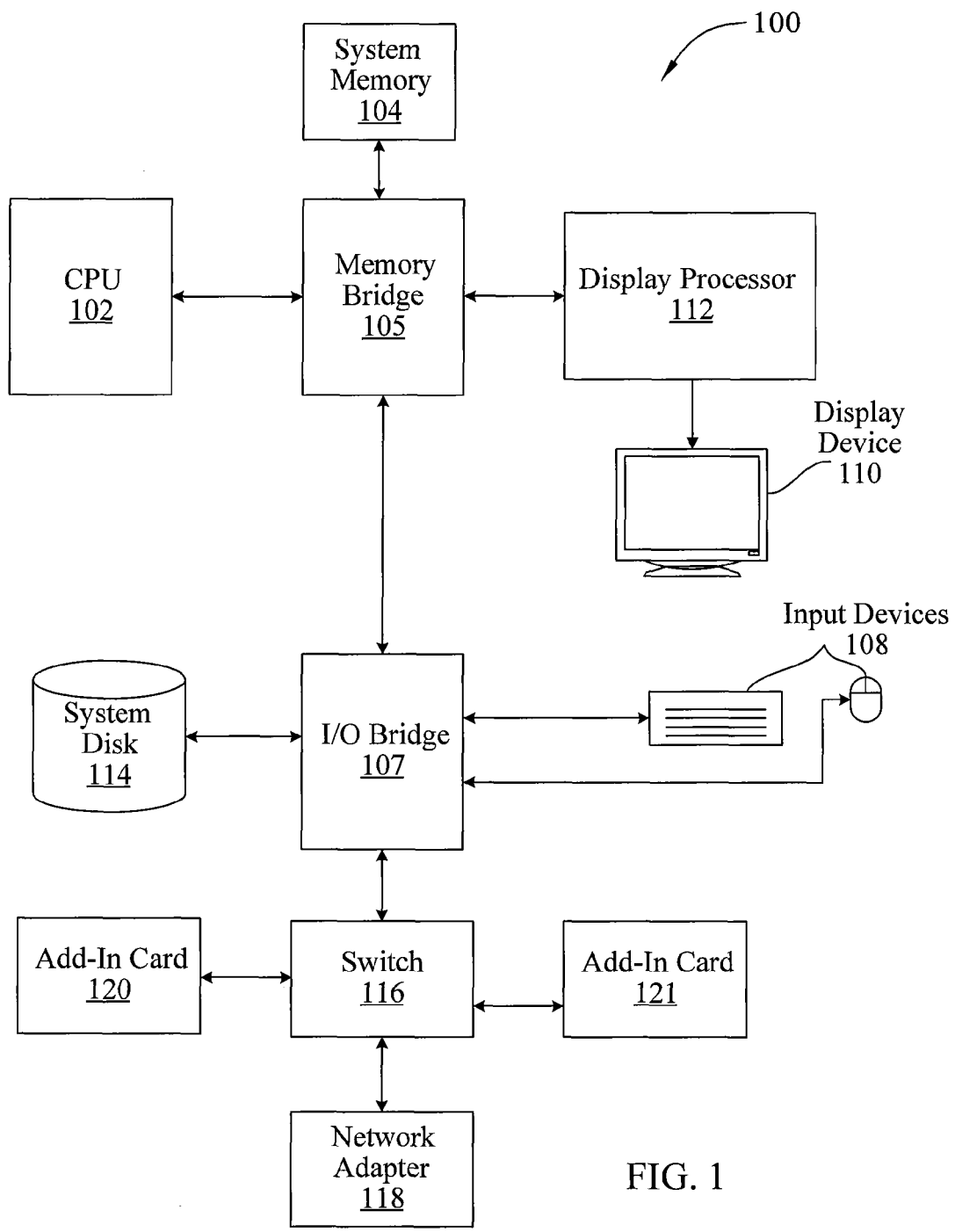
FIG. 1 is a block diagram of a system configured to implement one or more aspects of the present invention.

Embodiments of the invention provide a technique for performing hybrid hierarchical segmentation. Embodiments of the invention utilize k-means clustering to create a relatively large number of clusters. The result of performing k-means clustering is then passed through a hierarchical model to determine the optimal cluster groupings, thereby removing the biasing effect of the pre-defined number of samples. This hybrid approach allows embodiments of the invention to consider all of the original data, while still creating a holistic segmentation that maximizes the similarities within a cluster as well as maximizes the Euclidean distances between clusters.

Targeted online advertising has achieved enormous popularity in recent years. With targeted online advertising, many advertisers are interested in reaching specific online users that have a higher interest in their products and these advertisers are willing to pay a higher CPM (cost per thousand impressions) for this targeted advertising. Historically, targeted advertising has been accomplished by selling inventory in a particular section of an online environment, such as a website, virtual world, or massively multiplayer online game (MMOG), or any other online environment. For example, an automobile company may be interested in reaching automobile enthusiasts and would therefore target the auto racing section of a website devoted to sports. Since this inventory is guaranteed and in high demand, once the auto racing section is sold out, a website loses the ability to sell ads to advertisers who are looking to reach a similarly targeted audience.

According to embodiments of the invention, online users can be segmented to allow for targeted advertising to these desired users, regardless of the section of the website that the users visit. Many companies attempting to solve this segmentation problem do so via a traditional form of clustering or segmentation methodology. The most common technique is to create mutually exclusive segments utilizing a hierarchical clustering technique. However, hierarchical clustering is not feasible in situations involving an extremely large dataset, such as a dataset with over 150 million users each having over 500 parameters or attributes. Examples of parameters associated with a user may include, without limitation, registration data (e.g., gender, age, etc.) zip code level aggregated demographic attributes, and detailed online behavioral-based data, such as page views. To achieve desirable results, many if not all of the parameters associated with a user should be considered when clustering the users. Otherwise, if many of the parameters are excluded from the computations, then the clustering technique is unlikely to provide the most accurate and sellable segments.

According to embodiments of the invention, a first step in performing hybrid clustering includes generating a number of pre-clusters. In some embodiments, generating the pre-clusters may include performing a k-means clustering algorithm, which may include randomly selecting "seed values" for a set of variables and building the pre-clusters around the seed values. Any number of pre-clusters may be generated. In some embodiments, a relatively large number of pre-clusters may be implemented. For example, approximately 50, 100, or 150 pre-clusters may be generated. In some embodiments, the amount of pre-clusters to generate may be based on the size and variance of the data set. Then, the pre-clusters generated are input to a second step that performs hierarchical segmentation. By performing hierarchical segmentation with an input of approximately 50 to 100 pre-clusters, the hierarchical segmentation algorithm can be readily implemented on standard processors available today. The results of implementing such a hybrid technique are both statistically replicable and stabilized. Statistical replicability involves an experimental condition in which the variability associated with a given result can be estimated.

In sum, embodiments of the invention provide a technique for segmenting observations. Embodiments of the invention are especially useful for extremely large data sets that require the segmentation to be replicable.

System Overview

FIG. 1 is a block diagram of a system 100 configured to implement one or more aspects of the present invention. System 100 may be a computer workstation, personal computer, video game console, personal digital assistant, rendering engine, mobile phone, hand held device, smart phone, super-smart phone, or any other device suitable for practicing one or more embodiments of the present invention.

As shown, system 100 includes one or more processing units, such as central processing unit (CPU) 102, and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

One or more display processors, such as display processor 112, are coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

According to embodiments of the invention, one or more clusters may be calculated based on implementing a hybrid segmentation technique. Certain embodiments of the invention may be implemented in software stored in system memory 104 and executed by CPU 102 and/or display processor 112. Other embodiments may be implemented as one or more shader programs executed by display processor 112. Still further embodiments may be implemented in fixed function hardware included within display processor 112. Other embodiments may be implemented as a combination of hardware and software.

Hybrid Segmentation

Figure 2:
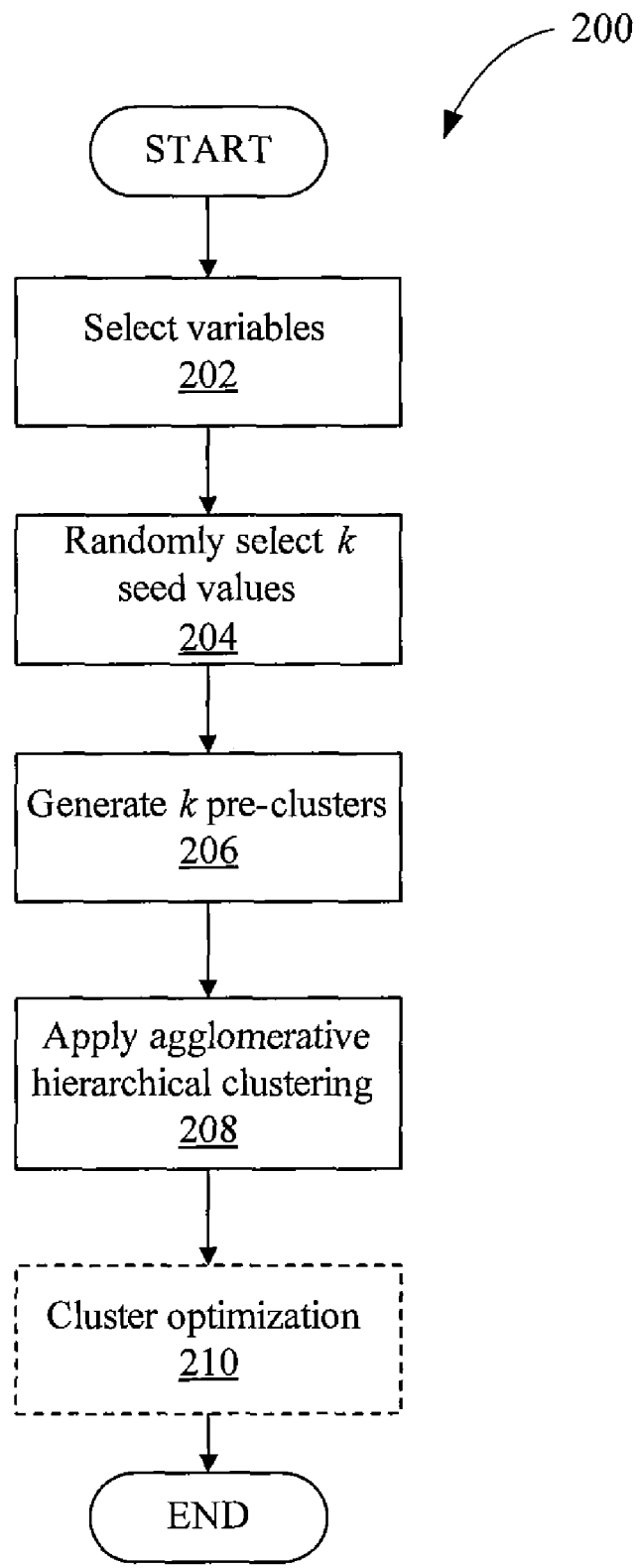
FIG. 2 is a flow diagram of method steps for performing hybrid hierarchical segmentation, according to one embodiment of the invention.

FIG. 2 is a flow diagram of method steps for performing hybrid hierarchical segmentation, according to one embodiment of the invention. Persons skilled in the art will understand that, even though the method 200 is described in conjunction with the system of FIG. 1, any system configured to perform the method steps, in any order, is within the scope of embodiments of the invention.

As shown, the method 200 begins at step 202, where a processor selects one or more variables to use when clustering observations. In one embodiment, the observations are registered users of a website and the variables are parameters associated with each user. In one embodiment, a variable clustering technique is used to select one or more variables out of possibly hundreds of variables to use in the segmentation. In some embodiments, variable clustering divides a set of variables into several non-overlapping variable clusters so that a large set of variables can be replaced by one variable from each cluster of variables that acts as a representative variable.

In some embodiments, a "$1-R^2$ ratio" may be calculated that calculates the ratio of 1 minus the coefficient of determination ($R^2$) for a variable in its own cluster and $1-R^2$ for the variable in the next closest cluster. As is known, the coefficient of determination is a measure of variability of a statistical model. The "$1-R^2$ ratio" may be used to identify which variable in each cluster is most representative:

$$1 - R^2 \text{ ratio} = \frac{1 - R^2_{(own\_cluster)}}{1 - R^2_{(next\_closest\_cluster)}}. \quad \text{(Equation 1.1)}$$

The ratio may be calculated for each candidate variable in each cluster. Small values of the ratio indicate that a variable has a high correlation with its own cluster and a low correlation with other clusters. Therefore, the variable with the lowest ratio is preferred and is selected as a representative variable. In addition, in some embodiments, business knowledge may also be used in combination with this variable clustering technique to select the final variables.

At step 204, the processor randomly selects k seed value sets to be used in a k-means clustering algorithm. In some embodiments, k may be approximately 50 to 100, which is a relatively large number when compared to conventional k-means computations. At step 206, the processor implements a k-means clustering algorithm to generate k pre-clusters.

Figure 3A:
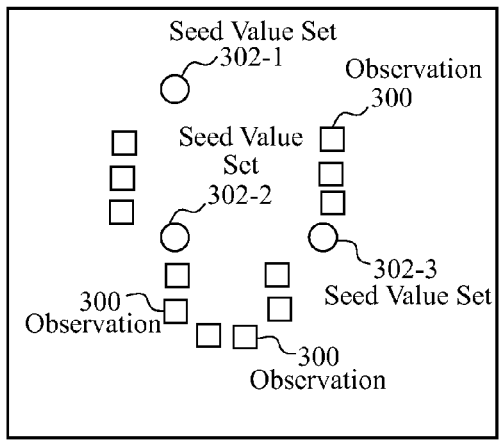
FIGS. 3A-3D are conceptual diagrams that illustrate performing k-means clustering, according to one embodiment of the invention.

FIGS. 3A-3D are conceptual diagrams that illustrate performing k-means clustering, according to one embodiment of the invention. k-means clustering is a technique for cluster analysis that aims to partition the observations into k pre-clusters in which each observation belongs to the cluster with the nearest mean. As shown in FIG. 3A, the algorithm begins with a dataset of observations 300. In the example shown in FIG. 3A, k is selected to equal 3. Thus, k=3 seed value sets 302-1, 302-2, 302-3 are randomly selected. In one embodiment, random values are selected for each of the variables associated with the observations to randomly select the seed value sets. In another embodiment, k different observations are selected for the seed value sets.

Figure 3C:
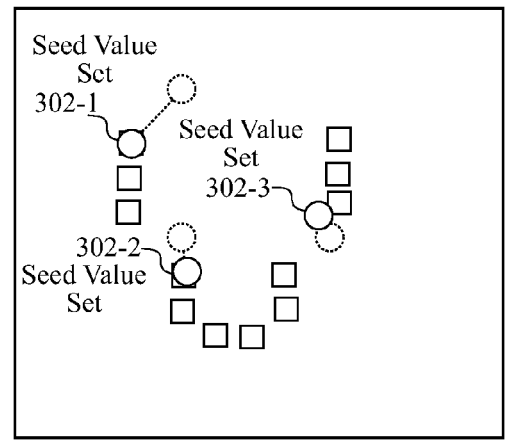
Figure 3B:
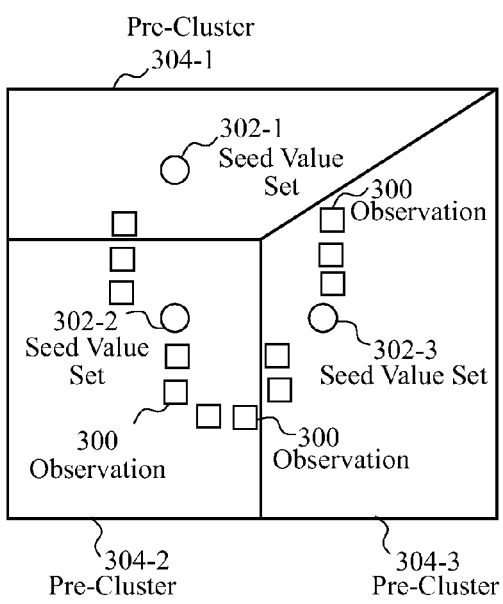

As shown in FIG. 3B, an initial set of pre-clusters 304-1, 304-2, 304-3 is identified by associating each observation with the seed value set having the nearest mean of variable values. As shown, the observations are organized into pre-clusters 304-1, 304-2, 304-3 associated with seed value sets 302-1, 302-2, 302-3, respectively. In one embodiment, each observation is assigned to the seed value sets having the shortest Euclidean distance. The Euclidean distance is the square root of the sum of the square of the difference between each variable associated with the k-means computation. In the example shown in FIG. 3B, the variables associated with each observation and each seed value set may be x- and y-coordinate values.

Figure 3D:
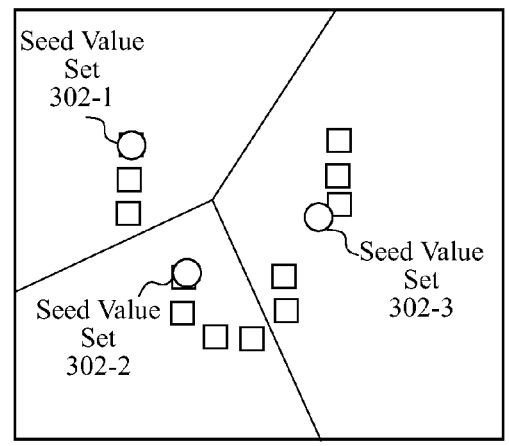

Next, as shown in FIG. 3C, the center of each cluster becomes the new mean and the seed value sets are updated with the new values for the variables that represent the center of each cluster. Again, a set of pre-clusters is identified by associating each observation with the updated seed value set having the nearest mean of variable values. This process is repeated unit convergence has been reached, as shown in FIG. 3D. For example, the process repeats until there is no change in the pre-cluster centers or no change in the allocation of observations to the k pre-clusters.

According to some embodiments of the invention, the initial dataset includes over 150 million observations and k is selected to be approximately 50 to 100. Thus, by implementing the k-means algorithm, the dataset is divided into k pre-clusters. In other embodiments, any number of pre-clusters may be generated. In addition, in some embodiments, the number of pre-clusters generated is based on the size and variance in the data set.

Referring back to FIG. 2, at step 208, the processor applies an agglomerative hierarchical clustering technique. Agglomerative hierarchical clustering is also referred to herein as hierarchical segmentation or hierarchical clustering.

Hierarchical clustering begins with each observation being considered as a separate cluster and then proceeds to combine the clusters until all observations belong to one cluster. Decomposition of data objects into a several levels of nested partitioning (i.e., a tree of clusters) is called a dendogram. A clustering of the data objects is obtained by cutting the dendogram at the desired level, where each connected component at that level forms a cluster.

Various techniques may be used to implement agglomerative hierarchical clustering. Typical algorithms for agglomerative hierarchical clustering include (a) average linkage clustering, (b) complete linkage clustering, (c) single linkage clustering, and (d) Ward's linkage clustering, among others.

Average linkage clustering uses the average similarity of observations between two groups as the measure between the two groups:

$$D_{KL} = \frac{1}{N_K N_L} \sum_{i \in C_K} \sum_{j \in C_L} d(x_i, x_j),$$ (Equation 1.2)

where $D_{KL}$ is the distance or dissimilarity between cluster $C_K$ and cluster $C_L$, where $N_K$ is the number of observations in cluster $C_K$, $N_L$ is the number of observations in cluster $C_L$, and where $d(x,y)$ is the distance or dissimilarity between observations (or vectors) x and y.

Complete linkage clustering uses the furthest pair of observations between two groups to determine the similarity of the two groups:

$$D_{KL} = \max_{i \in C_K} \max_{j \in C_L} d(x_i, x_j)$$ (Equation 1.3).

Single linkage clustering, on the other hand, computes the similarity between two groups as the similarity of the closest pair of observations between the two groups:

$$D_{KL} = \min_{i \in C_K} \min_{j \in C_L} d(x_i, x_j)$$ (Equation 1.4).

Ward's linkage clustering is distinct from all the other techniques since it uses an analysis of variance approach to evaluate the distances between clusters. In short, this technique attempts to minimize the Sum of Squares (SS) of any two hypothetical clusters that can be formed at each step:

$$D_{KL} = \frac{\|\vec{x}_K - \vec{x}_L\|^2}{\frac{1}{N_K} + \frac{1}{N_L}},$$ (Equation 1.5)

where $\vec{x}_K$ and $\vec{x}_L$ are mean vectors for clusters $C_K$ and $N_L$, respectively.

As described above, the tree of clusters that results from agglomerative hierarchical clustering can be pruned at any desired level, which may be determined based on business requirements for the number of final segments. In one embodiment, the final number of segments is approximately 10.

Figure 5:
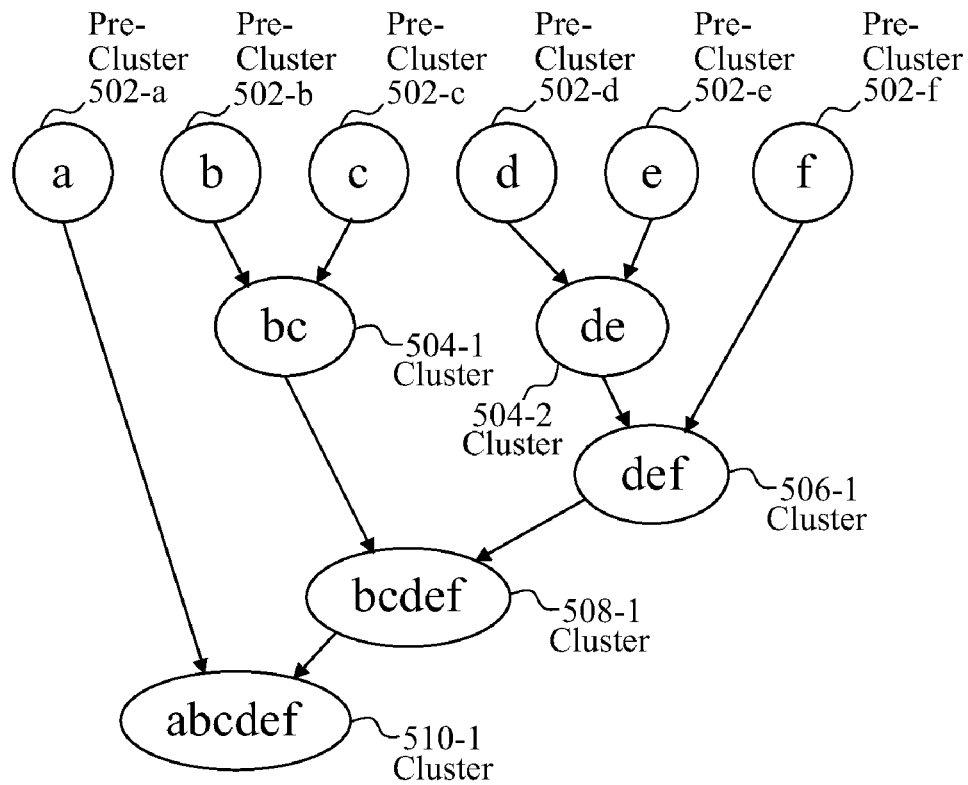
FIG. 5 is a conceptual diagram illustrating performing hierarchical segmentation, according to one embodiment of the invention.

FIG. 5 is a conceptual diagram illustrating performing hierarchical segmentation, according to one embodiment of the invention. As shown, pre-clusters 502-a through 502-f are input into the agglomerative hierarchical clustering algorithm. In one embodiment, the pre-clusters 502-a through 502-f are generated using a k-means clustering algorithm, as described above. Pairs of clusters are merged at different levels in the hierarchy according to the selected agglomerative hierarchical clustering algorithm. In one embodiment, the union of each possible cluster pair is considered and the two clusters whose combination results in the smallest increase in the error sum of squares are grouped together.

In the example shown in FIG. 5, pre-clusters 502-a and 502-b are merged to generate cluster 504-1. Similarly, pre-clusters 502-d and 502-e are merged to generate cluster 504-2. Then, cluster 504-2 is merged with pre-cluster 502-f into cluster 506-1. Cluster 504-1 is then merged with cluster 506-1 into cluster 508-1. Lastly, pre-cluster 502-a is merged with cluster 508-1 into cluster 510-1.

Figure 4:
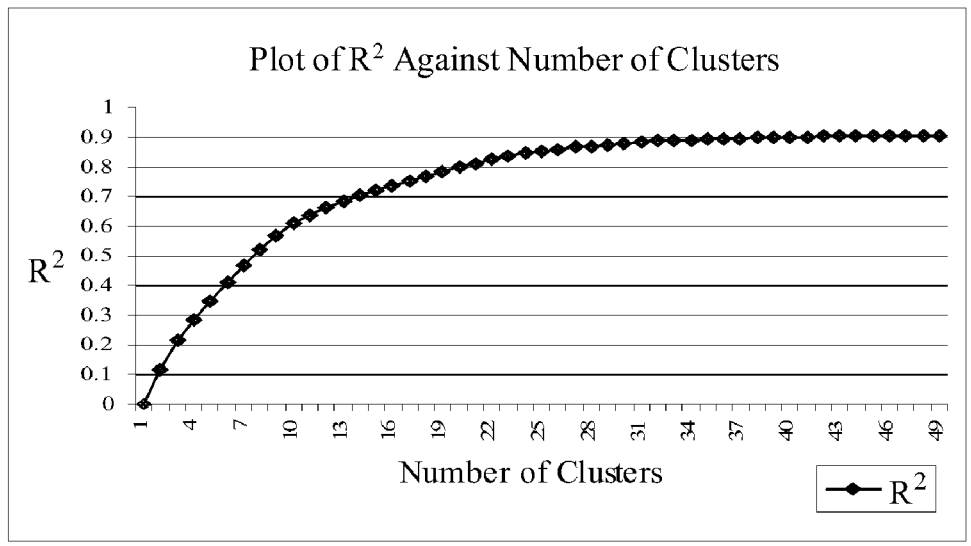
FIG. 4 is a plot of a coefficient of determination ($R^2$) to a number of clusters, according to one embodiment of the invention.

FIG. 4 is a plot of a coefficient of determination ($R^2$) to a number of clusters, according to one embodiment of the invention. In some embodiments, the selection of the number of clusters is based on a point of diminishing returns. For example, a determination may be made as to a point at which the number of clusters begins to have a marginal impact on the $R^2$ values. In one example, each observation comprises a cluster, which means that the implementation accounts for all the variation, and the $R^2$ is 100%. However, such an implementation is not an optimal solution since it does not serve the business need of classifying the observations in groups of patterns to account for the variability in the data. In some embodiments, the determination of what is the optimum number of clusters is based on the nature of the data and the size of the $R^2$. For example, the larger the $R^2$, the greater the predictive power of the analysis. In some embodiments, an $R^2$ value below 30% provides a poor fit with the data set; whereas, an $R^2$ value above 80% has a good to excellent fit. Qualification of the $R^2$ values in between 30% and 80% depends, in part, on the nature of the data being analyzed.

Referring again to FIG. 2, at step 210, the processor performs cluster optimization. In some embodiments, a cluster may be modified from time to time to accommodate for evolving business requirements. Implementing step 210 avoids modification of the core algorithm with new business requirements.

For example, assume two segments (i.e., clusters) are generated using the technique described in FIG. 2. The segments may be "young" and "affluent." The young segment is defined as someone whose age is:

age $\leq M$, where: 18 years $\leq M \leq 21$ years.

The affluent segment may be someone whose income is:

income $\geq N$, where: $80 k per year $\leq N < $110$ k per year.

For business reasons, a new segment may be required that involves both types of users, young and affluent. In this example, the business demand for such a segment may be high, so the size of the new segment should be maximized.

Thus, an optimization problem may be implemented that maximizes the number of users with an age less than or equal to M and an income greater than or equal to N, subject to the constraints:

18 years $\leq M < 21$ years, and $80 k per year $\leq N < $110$ k per year.

In some embodiments, the optimization problem may be solved by linear programming or iterative simulation. In some embodiments, step 210 is optional and may be omitted.

Additionally, in some embodiments, after the method 200 has completed and the process results in several clusters, additional observations may be added to the dataset. For example, additional users may have registered with the website. In these embodiments, the additional user may be added to the cluster that is the closest match to the additional observation. For example, a least squares approach may be implemented.

In sum, embodiments of the invention provide a robust and scalable approach to clustering. The result of the presented clustering technique is a number of heterogeneous clusters with homogeneous contents, which means that there are substantial differences between the clusters, but the individual data sets within a single cluster are similar. Also, the segments are statistically replicable. Based on implementing the k-means approach, the pre-clusters are loosely formed. These loosely formed pre-clusters can then be fed into the second stage of the hybrid technique to reclassify the pre-clusters based on their similarity to one another. If the k-means portion were to be implemented again, the resultant pre-clusters would be based on the initial seeds that were randomly selected. However, the overall results of the hybrid approach, which feeds the pre-clusters to a hierarchical segmentation engine, is statistically replicable. Statistical replicability is an important feature of embodiments of the invention since the marketability of the segments/clusters to potential advertisers is significantly increased when the segments/clusters are replicable.

One advantage of embodiments of the invention is that they provide a clustering solution for a large number of observations that is computationally achievable with current hardware. Another advantage is that embodiments of the invention do not rely on the quality of the sample set and avoid the biasing problems associated with prior art techniques. Yet another advantage is that the resultant clusters are mutually exclusive allowing for greater marketability of the segments.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for clustering a plurality of observations included in a dataset, the method comprising:
    selecting a subset of variables from a set of variables by performing a variable clustering technique, wherein each variable in the subset is associated with each observation in the dataset, and wherein each variable in the subset comprises a representative variable for a different plurality of variables included in the set of variables;
    for each of a first number of times, randomly selecting an initial value for each variable in the subset to generate a seed value set that includes an initial value for each variable in the subset;
    generating a number of pre-clusters equal to the first number based on a similarity between each observation in the dataset and each of the first number of seed value sets; and
    applying a hierarchical clustering algorithm to the first number of pre-clusters to derive a second number of clusters.

2. The method of claim 1, wherein performing the variable clustering technique comprises calculating, for each variable in the set of variables, a ratio based on a coefficient of determination associated with a first cluster of variables, and a coefficient of determination associated with a second cluster of variables.

3. The method of claim 1, wherein generating the first number of pre-clusters comprises applying a k-means clustering algorithm.

4. The method of claim 1, wherein the hierarchical clustering algorithm comprises an average linkage clustering algorithm, a complete linkage clustering algorithm, a single linkage clustering algorithm, or a Ward's linkage clustering algorithm.

5. The method of claim 1, wherein the second number of clusters is associated with a threshold value for a coefficient of determination for the dataset.

6. The method of claim 5, wherein the threshold value for the coefficient of determination is at least 80%.

7. The method of claim 1, wherein the clusters included in the second number of clusters are statistically replicable.

8. The method of claim 1, wherein the observations included in the dataset comprise registered users of a website, and the variables comprise parameters associated with the registered users.

9. The method of claim 8, wherein the dataset includes at least 150 million registered users, and each registered user is associated with at least 500 parameters.

10. The method of claim 9, wherein the parameters comprise registration data, zip code level aggregated demographic attributes, or online behavioral-based data.

11. A non-transitory computer-readable storage medium storing instructions that, when executed by a processor, cause a computer system to cluster a plurality of observations included in a dataset, by performing the steps of:
    selecting a subset of variables from a set of variables by performing a variable clustering technique, wherein each variable in the subset is associated with each observation in the dataset, and wherein each variable in the subset comprises a representative variable for a different plurality of variables included in the set of variables;
    for each of a first number of times, randomly selecting an initial value for each variable in the subset to generate a seed value set that includes an initial value for each variable in the subset;
    generating a number of pre-clusters equal to the first number based on a similarity between each observation in the dataset and each of the first number of seed value sets; and
    applying a hierarchical clustering algorithm to the first number of pre-clusters to derive a second number of clusters.

12. The computer-readable storage medium of claim 11, wherein performing the variable clustering technique comprises calculating, for each variable in the set of variables, a ratio based on a coefficient of determination associated with a first cluster of variables, and a coefficient of determination associated with a second cluster of variables.

13. The computer-readable storage medium of claim 11, wherein generating the first number of pre-clusters comprises applying a k-means clustering algorithm.

14. The computer-readable storage medium of claim 11, wherein the hierarchical clustering algorithm comprises an average linkage clustering algorithm, a complete linkage clustering algorithm, a single linkage clustering algorithm, or a Ward's linkage clustering algorithm.

15. The computer-readable storage medium of claim 11, wherein the second number of clusters is associated with a threshold value for a coefficient of determination for the dataset.

16. The computer-readable storage medium of claim 15, wherein the threshold value for the coefficient of determination is at least 80%.

17. The computer-readable storage medium of claim 11, wherein the clusters included in the second number of clusters are statistically replicable.

18. The computer-readable storage medium of claim 11, wherein the observations included in the dataset comprise registered users of a website, and the variables comprise parameters associated with the registered users.

19. The computer-readable storage medium of claim 18, wherein the dataset includes at least 150 million registered users, and each registered user is associated with at least 500 parameters.

20. The computer-readable storage medium of claim 19, wherein the parameters comprise registration data, zip code level aggregated demographic attributes, or online behavioral-based data.

21. A system for clustering a plurality of observations included in a dataset, the system comprising:
 a processor configured to:
  select a subset of variables from a set of variables by performing a variable clustering technique, wherein each variable in the subset is associated with each observation in the dataset, and wherein each variable in the subset comprises a representative variable for a different plurality of variables included in the set of variables,
  for each of a first number of times, randomly select an initial value for each variable in the subset to generate a seed value set that includes an initial value for each variable in the subset,
  generate a number of pre-clusters equal to the first number based on a similarity between each observation in the dataset and each of the first number of seed value sets, and
  apply a hierarchical clustering algorithm to the first number of pre-clusters to derive a second number of clusters.

22. The system of claim 21, further comprising a memory storing instructions that, when executed by the processor, configure the processor to:
 select the subset of variables from the set of variables;
 for each of a first number of times, randomly select the initial value for each variable in the subset to generate the seed value set;
 generate the number of pre-clusters equal to the first number; and
apply the hierarchical clustering algorithm to the first number of pre-clusters to derive the second number of clusters.

* * * * *